United States Patent [19]

Holladay et al.

[11] Patent Number: 4,480,588
[45] Date of Patent: Nov. 6, 1984

[54] APPARATUS FOR RAISING POULTRY UTILIZING HIGH DENSITY BROODING

[75] Inventors: John H. Holladay, Winterville, Ga.; Robert V. Marlin, Red Bank, Tenn.

[73] Assignee: Cumberland Corporation, Chattanooga, Tenn.

[21] Appl. No.: 520,833

[22] Filed: Aug. 5, 1983

[51] Int. Cl.³ .............................................. A01K 31/06
[52] U.S. Cl. ......................................... 119/17; 119/18; 119/82; 119/12
[58] Field of Search ....................... 119/18, 17, 21, 12, 119/82

[56] References Cited

U.S. PATENT DOCUMENTS

| 1,807,932 | 6/1931 | Rainwater | 119/22 |
| 1,883,710 | 10/1932 | Graham | 119/22 |
| 2,068,566 | 1/1937 | Olson et al. | 119/48 |
| 2,096,356 | 10/1937 | Fox | 119/48 |
| 2,197,160 | 4/1940 | Schuppner | 119/48 |
| 2,214,462 | 9/1940 | Hill | 119/17 |
| 2,294,025 | 8/1942 | Dagg | 119/48 |
| 2,302,314 | 11/1942 | Haggart | 119/51 R |
| 2,309,458 | 1/1943 | Ingraham | 119/48 |
| 2,383,326 | 8/1945 | Lovell | 119/22 |
| 2,390,924 | 12/1945 | Cornell et al. | 119/21 |
| 2,585,698 | 2/1952 | Spring | 119/22 |
| 2,805,644 | 9/1957 | Lieberman | 119/22 |
| 2,987,038 | 6/1961 | Cole | 119/18 |
| 3,075,495 | 1/1963 | Stoterau et al. | 119/21 |
| 3,173,564 | 3/1965 | Mayo | 119/12 X |
| 3,319,606 | 5/1967 | Virgil | 119/51 R |
| 3,389,780 | 6/1968 | Jerome | 119/82 X |
| 3,452,718 | 7/1969 | Wight | 119/82 |
| 3,465,722 | 9/1969 | Duff | 119/18 |
| 3,498,267 | 3/1970 | Leeming | 119/61 |
| 3,523,519 | 8/1970 | Hostetler | 119/52 AF |
| 3,611,995 | 10/1971 | Murte | 119/52 AF |
| 3,621,818 | 11/1971 | Johnston et al. | 119/12 |
| 3,633,963 | 1/1972 | Haynes | 119/12 X |
| 3,702,600 | 11/1972 | Bright et al. | 119/82 |
| 3,707,949 | 1/1973 | Lippi | 119/18 |
| 3,722,477 | 3/1973 | Weldy et al. | 119/82 |
| 3,738,323 | 6/1973 | Boterweg | 119/18 |
| 3,768,444 | 10/1973 | Van Huis | 119/22 |
| 3,776,191 | 12/1973 | Murto | 119/18 |
| 3,777,710 | 12/1973 | Rhinehart | 119/17 |
| 3,871,335 | 3/1975 | Johnston et al. | 119/82 |
| 3,900,006 | 8/1975 | Shockley, Jr. | 119/18 |
| 3,916,835 | 11/1975 | Reynolds | 119/12 |
| 3,942,476 | 11/1975 | Napier | 119/21 |
| 3,948,219 | 4/1976 | Groppel | 119/18 |
| 3,952,703 | 4/1976 | Erfeling | 119/17 |
| 3,952,706 | 4/1976 | Hart | 119/75 |
| 3,978,819 | 9/1976 | Lovitt | 119/22 |
| 3,996,896 | 12/1976 | Slaats et al. | 119/17 |
| 4,019,461 | 4/1977 | Keen | 119/18 |
| 4,020,793 | 5/1977 | Morrison | 119/18 |
| 4,233,939 | 3/1979 | Sauer et al. | 119/18 |
| 4,273,071 | 5/1979 | Clark et al. | 119/17 |
| 4,321,887 | 1/1981 | Martin et al. | 119/22 |

FOREIGN PATENT DOCUMENTS 142494 7/1980 Austria .............................. 119/82

Primary Examiner—Hugh R. Chamblee
Attorney, Agent, or Firm—Cushman, Darby & Cushman

[57] ABSTRACT

Multi-tiered cage assemblies are paired in spaced end-to-end relationship within a brood house. The floors of the cage assemblies are sequentially movable between the paired assemblies. During an initial sequence of such movement, newborn chicks are placed on the floors as they pass through the space separating the cage assemblies, and continued floor movement carries the chicks into the cage assemblies. The tiers are vertically spaced from one another by a distance limited to that sufficient to provide headroom for a chick approximately three weeks of age. During the period the chicks are maintained in the cage assemblies, feed and water are continuously supplied to the chicks. When the floors are sequentially returned to the cage assemblies from which they previously had been moved, the chicks are dropped onto conveying means which carry the chicks to a motor vehicle for transport to a finishing house where grow-out is completed.

27 Claims, 17 Drawing Figures

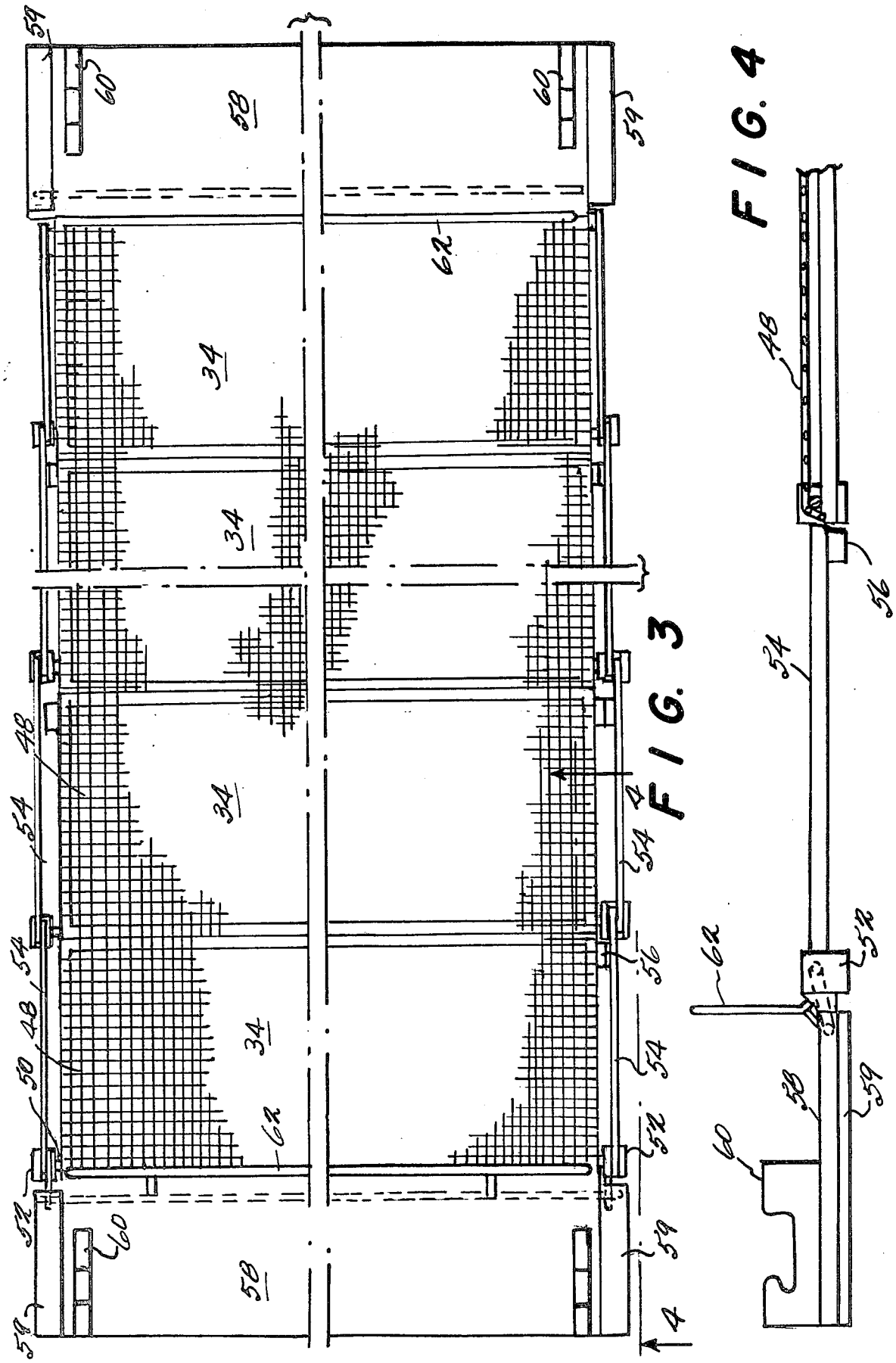

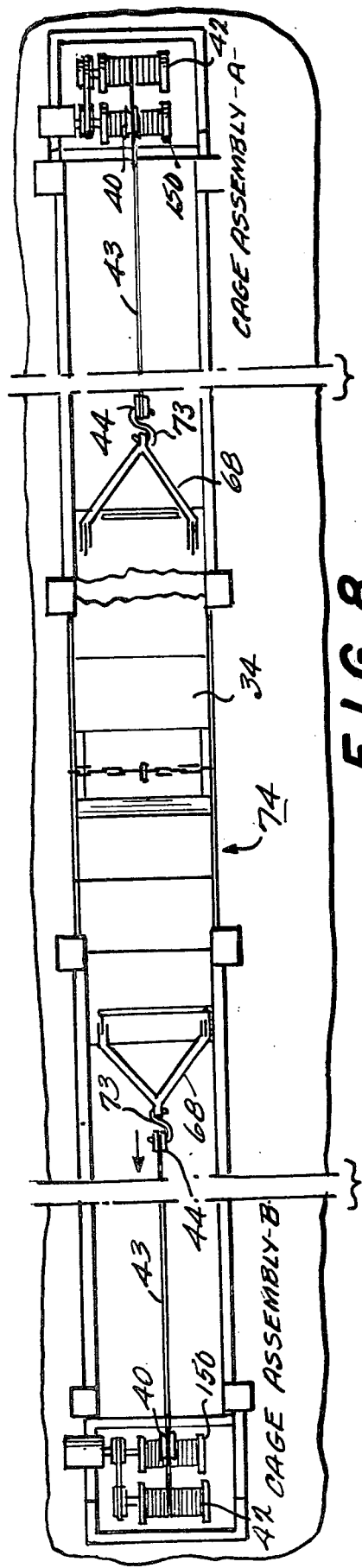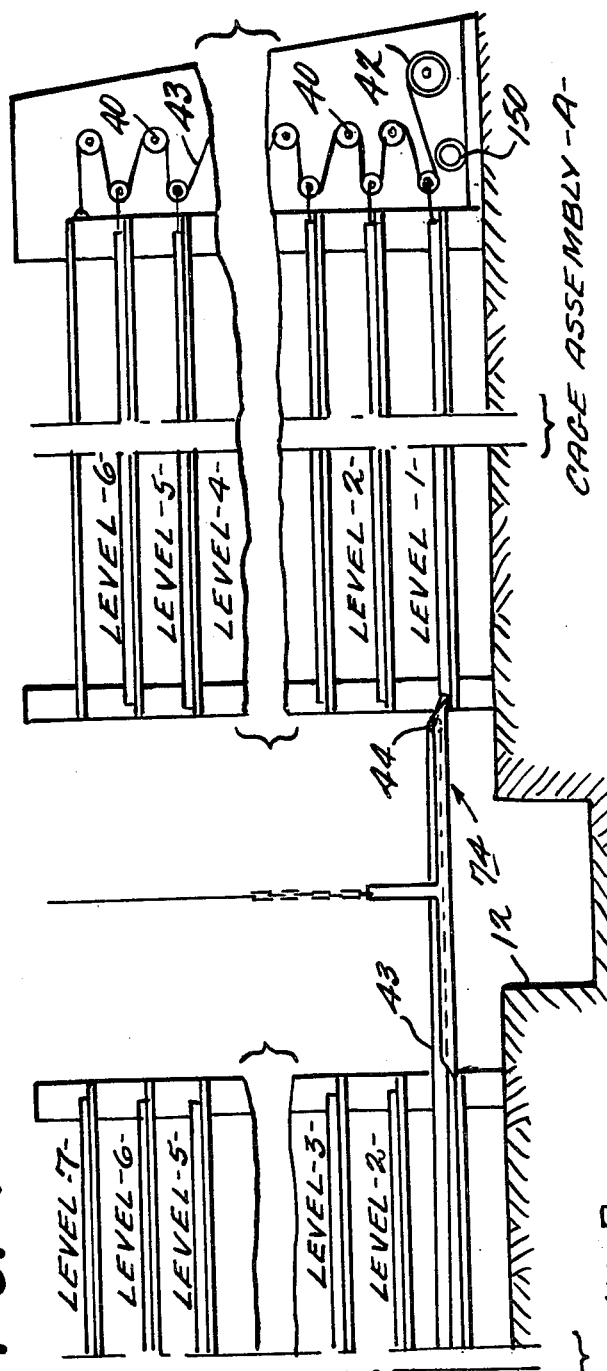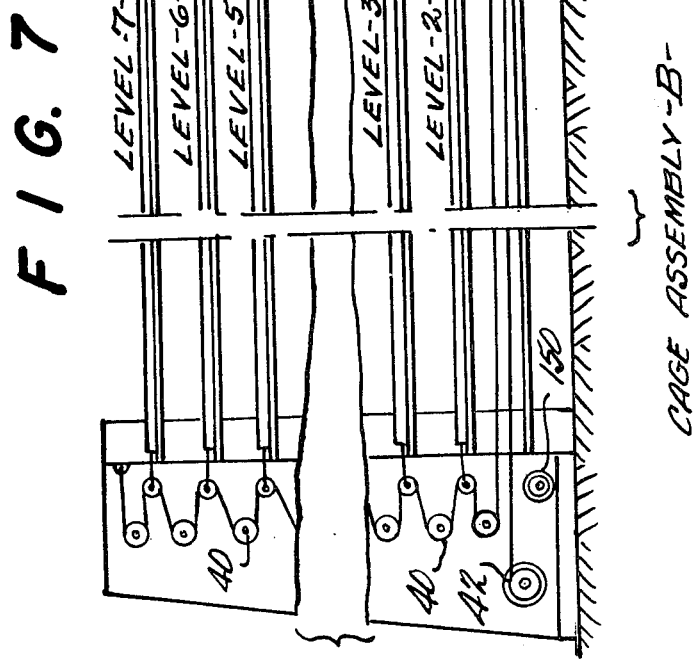

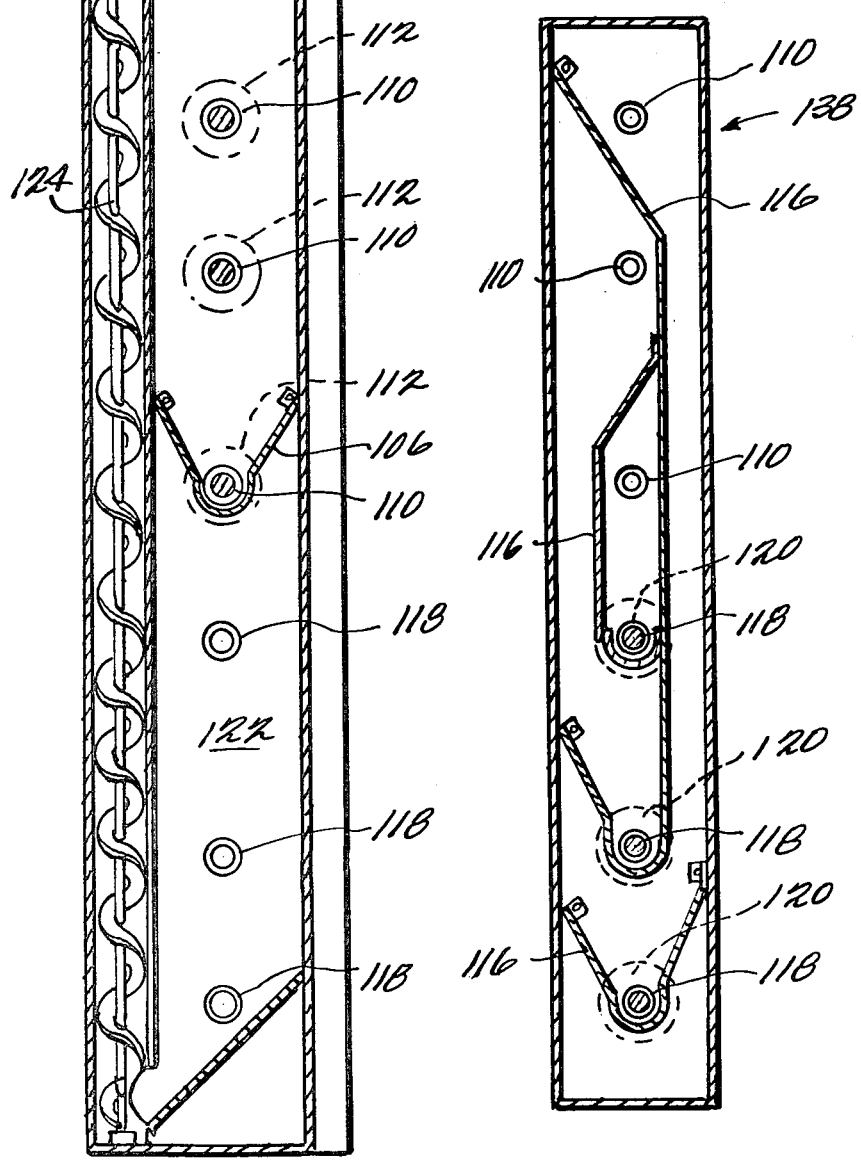

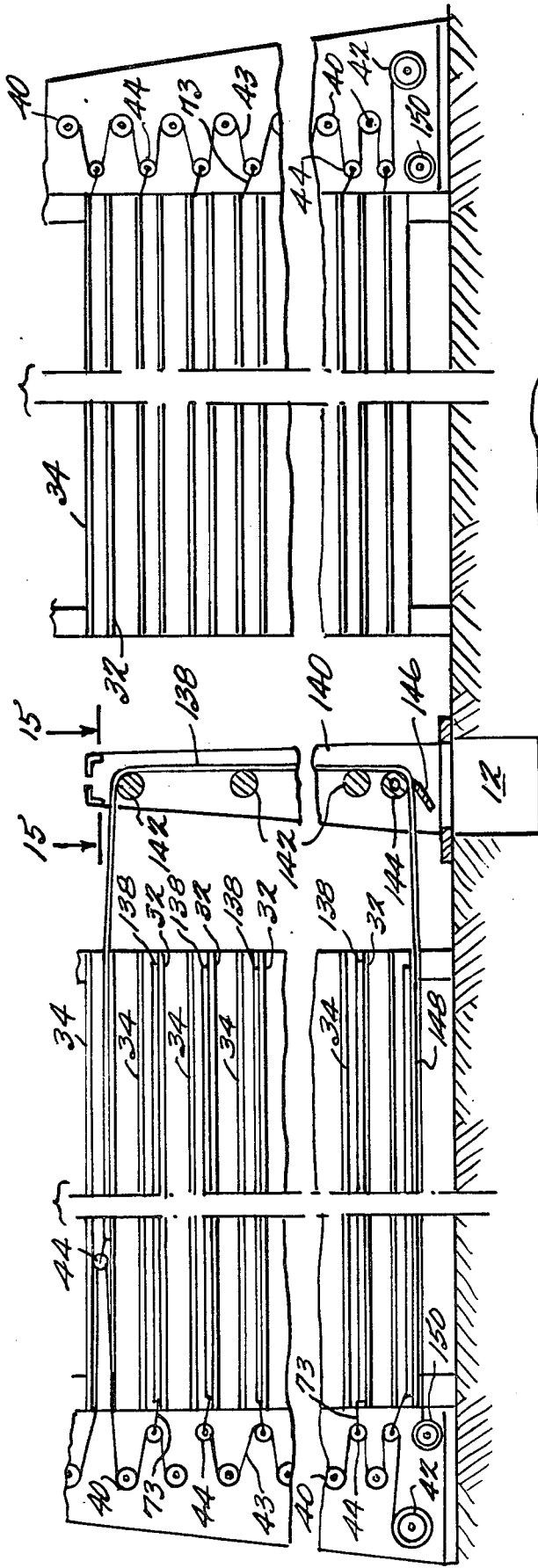
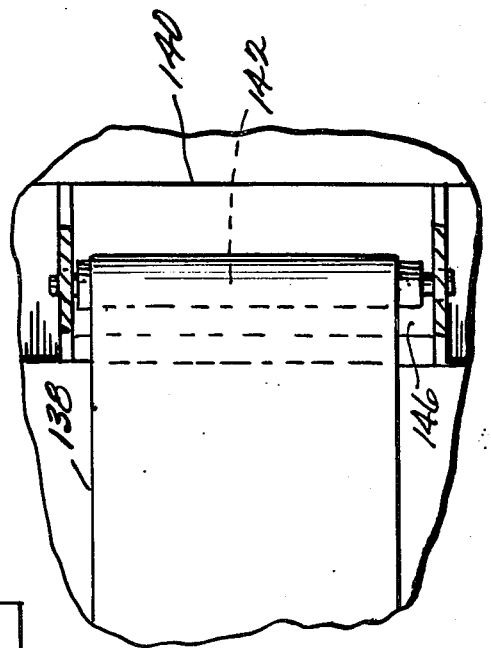
FIG. 14
FIG. 15

APPARATUS FOR RAISING POULTRY UTILIZING HIGH DENSITY BROODING

BACKGROUND OF THE INVENTION

The present invention represents an important improvement in poultry management. More particularly, improved methods and apparatus are employed for raising broilers with increased efficiency and quality, as well as with substantial economical advantages.

In conventional broiler-raising operations, large houses are provided for receiving very young chicks. For a period of approximately 7 weeks, the chicks remain in the house where they freely roam. Food and water are continuously available, and the house is suitably heated or ventilated as conditions require. A 7-week period is employed to finish the broilers since the so-called "feed conversion rate" drops significantly as the birds remain in the house beyond that age. Feed conversion involves the relationship of food consumed to increase the bird's body weight, and this parameter is of particular importance to the poultry grower.

For a given broiler house, only relatively few broiler cycles are possible each year. Allowing one week for cleaning the house after a group of broilers is removed, conventional broiler house usage permits a maximum of 6.5 grow-outs to be completed each year $$\left( \text{i.e.} \ \frac{52 \text{ weeks}}{7 \text{ weeks per group} + 1 \text{ week cleanout per group}} = 6.5 \right).$$

In practice, however, the average number of broiler cycles has been found to be 5.2 to 5.5 grow-outs per year. This indicates that the actual time required between grow-outs is greater than one week.

A typical broiler house having dimensions of approximately 36′×450′ will accommodate about 20,000 birds. This is because an average 7-week-old broiler occupies roughly 0.75 sq. ft. In the case where a grower has 5 houses, he can produce approximately 100,000 broilers per grow-out. If he desires to double his production by conventional grow-out techniques, he must build an additional 5 houses.

If, in accordance with the present invention, the operator of the broiler finishing houses is provided with birds at 3 weeks of age, only 4 weeks are required in the houses to produce finished broilers. Furthermore, the houses do not have to be completely cleaned after only 4 weeks of occupancy. Consequently, over the course of a year, cleanout time can more correctly be said to average one week per group of birds than in the case where the houses are used for 7 weeks for each grow-out. Under such circumstances, the broiler house operator can achieve 10.4 grow-outs per year $$\left( \text{i.e.} \ \frac{52 \text{ weeks}}{4 \text{ weeks per group} + 1 \text{ week cleanout per group}} = 10.4 \right).$$

As compared with the conventional average of about 5.2 grow-outs per year, by raising birds just from their 4th through 7th weeks, the operator can double his production without having to increase the number of finishing houses.

In accordance with the invention to be described in detail hereinafter, a high density brood house is provided for raising chicks until they are approximately 3 weeks old at which time they are transported to conventional broiler finishing houses. A high density brood house having a capacity of producing about 100,000 chicks (enough to supply 5 conventional finishing houses of the size cited above) can be constructed at a lesser cost than the building of 5 additional houses required to double production in accordance with conventional broiler raising practice.

Although the combined use of a high density brood house and conventional broiler finishing houses requires a special vehicle to transport the approximately 3-week-old chicks to the finishing houses, the use of multiple combinations of such brood and finishing houses permits the cost of the vehicle to be distributed among such combinations so as not to eliminate the economic advantage obtained by interfacing the high density brood houses with the finishing houses. Furthermore, the use of high density brood houses provides a number of additional advantages including:

1. decreased land usage;
2. decreased energy consumption;
3. a controlled environment for young chicks during their most critical stage of growth;
4. reduced labor;
5. an improved grade of fertilizer derived from the brood house droppings; and
6. decreased medication requirements.

SUMMARY OF THE INVENTION

Briefly, the invention comprises an arrangement wherein multi-tier cage assemblies are paired in spaced end-to-end relationship within a brood house. The cage assemblies are provided with floors which can be moved sequentially from a tier in one cage assembly to a vacant tier in the other of the paired cage assemblies. During an initial sequence of movement, as the floors pass through the space between the cage assemblies, newborn chicks are placed on the floors and are thereby entered into the cage assemblies. The tiers of each assembly are vertically spaced from one another by a distance limited to that sufficient to provide headroom for a chick approximately three weeks of age. While housed within the cage assemblies, the chicks are continuously provided with feed and water by means of troughs which extend for the full length of the case assemblies at each tier level at which the chicks are housed. After approximately three weeks, the floors are sequentially returned to the cage assembly from which they previously had been moved. During passage of the floors through the space separating the respective cage assembly pairs, the floors are dropped to deposit the chicks on conveyors which carry them to a motor vehicle for transport to a finishing house where grow-out is completed. Means are provided for removal of droppings from the cage assemblies prior to the introduction of a new batch of chicks to the assemblies.

Details of the invention now will be described with respect to the accompanying drawings, wherein:

FIG. 3 is a top plan view of a movable floor portion of a cage assembly;

FIG. 4 is an enlarged sectional view taken along line 4—4 of FIG. 3;

FIG. 7 is a diagrammatic illustration showing the several floor-receiving levels of a pair of facing cage assemblies;

FIG. 8 is a top plan view diagrammatically illustrating the transfer of a floor from a first cage assembly to a second cage assembly;

FIG. 11 is a view, partially in section, of a feed distribution unit for a cage assembly;

FIG. 12 is a cross-sectional view of an end unit portion of the feed distribution system for a cage assembly;

FIG. 14 is a fragmented diagrammatic view, partially in section, of the arrangement for removing droppings from a cage assembly;

FIG. 15 is an enlarged view of a portion of the droppings removal arrangement taken along line 15—15 of FIG. 14;

Figure 1:
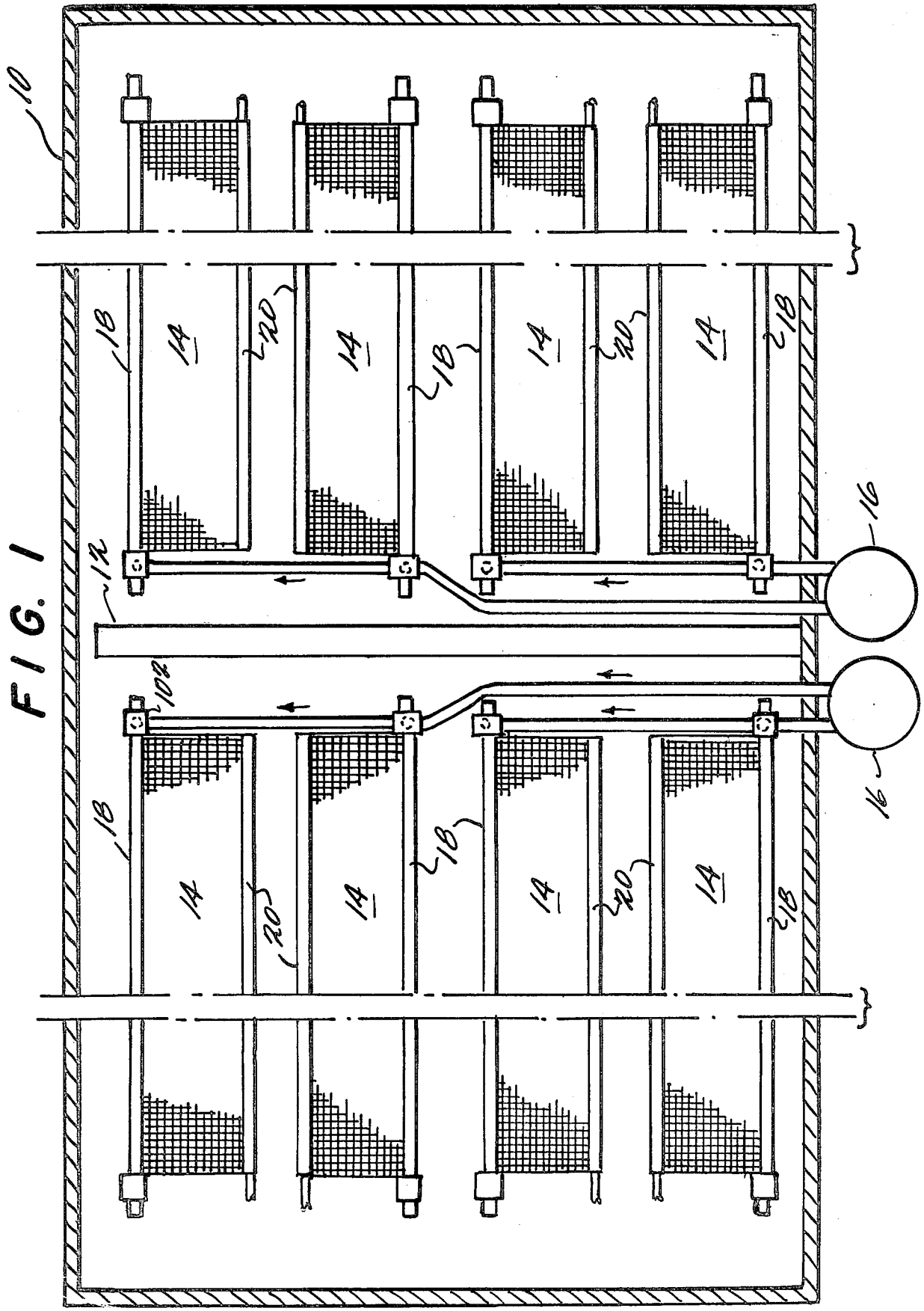
FIG. 1 is a top plan view diagrammatically illustrating the layout of cage assemblies in a high density brood house.

Referring first to FIG. 1, there is illustrated a cage assembly arrangement for housing chicks in a high density brood house. As shown in the diagrammatic top plan view of FIG. 1, the brood house 10 is divided by a trench 12 several feet wide which extends across the width of the house. A plurality of multi-tier cage assemblies 14 are paired in end-to-end facing relationship on opposite sides of the trench. Feed is supplied to the cages automatically. More particularly, at least one feed source 16 is connected to the cage assemblies in such a manner that feed is conveyed to automatic feeders 18 which run along one side of each cage assembly at each level thereof. Similarly, water is directed to troughs 20 running the length of the cage assemblies, the water also being available at each tier. Details of the apparatus by which feed and water are supplied to the cage assemblies 14 will be described hereinafter.

Figure 2:
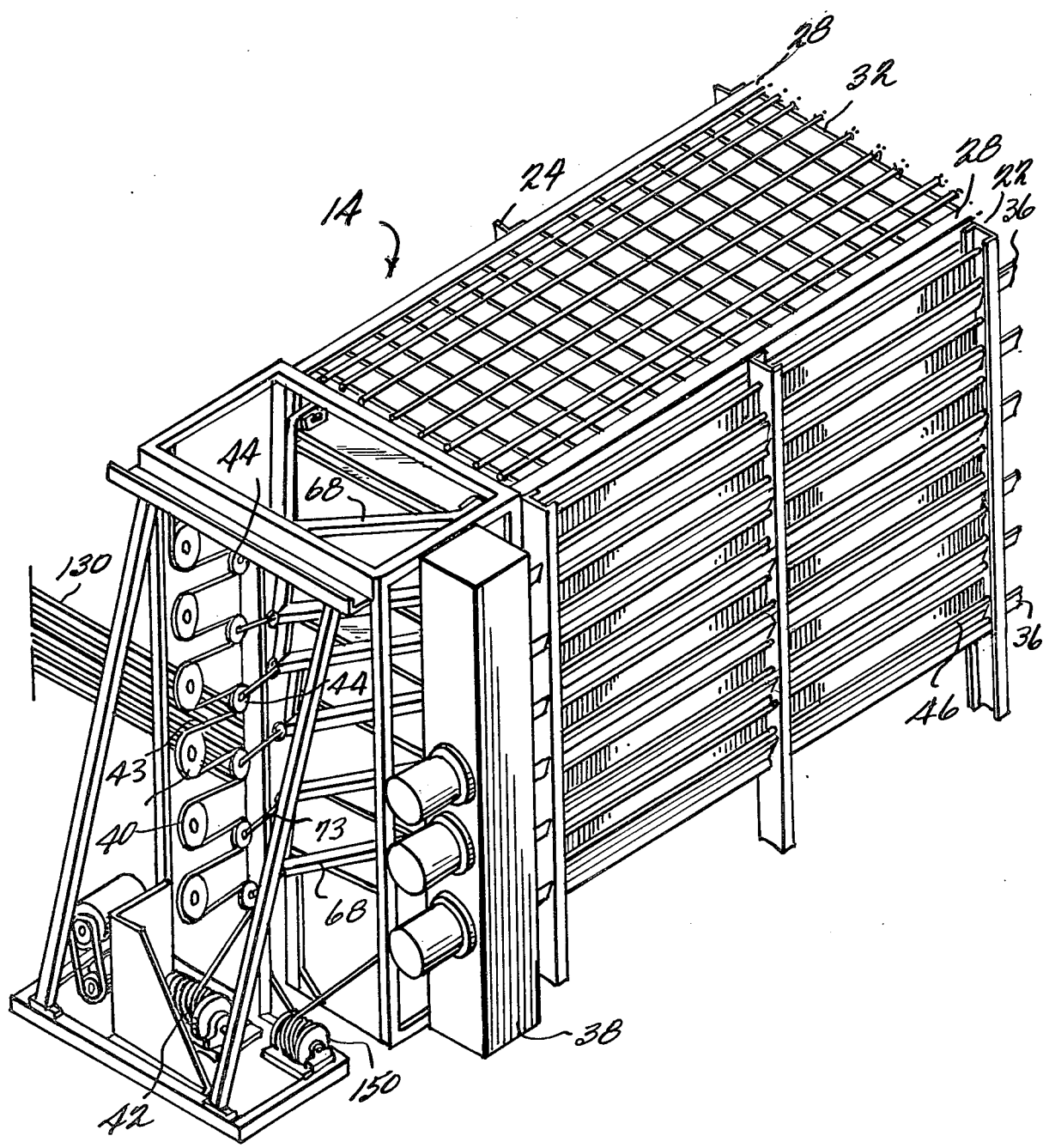
FIG. 2 is a perspective view of a cage assembly section.

FIG. 2 illustrates in greater detail a portion of one of the cage assemblies 14. The framework of the assembly includes a plurality of spaced, vertically oriented U-shaped elements 22 positioned along one side of assembly 14. Vertical supporting elements on the opposite side of the assembly comprise spaced, vertically oriented angle pieces 24. The elements 22 and 24 support various components which define the tops, sides and bottoms of multiple cages within each assembly 14.

As can be appreciated from FIG. 2, pairs of U-shaped channels 28 are located at different vertical levels along elements 22 and 24. Immediately below each of the channels 28 is a length of angle iron 30 which is joined to element 22 or 24 and which extends the length of the cage assembly. A rigid screen or grid 32 extends across the cage assembly and is secured to the angle irons 30 at that level. Screens 32 serve as the tops of compartments formed in tiers within the cage assembly.

A movable mesh floor 34 is adapted to be received by those pairs of U-shaped channels 28 positioned below the uppermost pair of angle irons 30. The space defined between a screen 32 and floor 34 below is limited to that sufficient to provide headroom for a chick approximately 3 weeks of age. The spacing between a floor 34 and the next lower screen 32 is sufficient to permit a litter removal mat (described in detail hereinafter) to rest on screen 32 immediately below a floor.

The U-shaped vertical support elements 22 also receive feed troughs 36 which pass through openings in elements 22. These troughs are located at each level of the multi-tier cage assembly. The vertical elements 24 on the opposite side of the cage assembly support chick waterers (not shown in FIG. 2, but detailed hereinafter) at each level of the cage assembly.

A feed distribution unit 38 located adjacent the ends of troughs 36 is employed for transporting feed along the troughs. A plurality of vertically spaced pulleys 40, generally positioned at levels corresponding to screens 32, are supported by framework at the end of the cage assembly remote from the center of the houses. A motor-driven winch 42 is positioned adjacent the lowermost one of the pulleys 40. By means of a winch-driven cable 43 which winds in serpentine fashion about pulleys 40 and sheaves 44 (the latter being joined to respective floors 34 in a manner hereinafter detailed), a selected floor can be moved along channel members 28 in a sequence which will hereinafter be described.

The vertical support elements 22 and 24 also support grills 46 pivotally mounted along their upper edges to the supports. These grills are arranged so as to be displaced about their pivoting axes by a person outside of the cage assembly, thereby permitting access to the interior of the cages.

Details of the movable floors 34 now will be described with reference to FIGS. 3 and 4. More particularly, a floor comprises a plurality of rectangular panels 48 each formed by a rigid metal or plastic grid supported by suitable framework. At the forwardmost edge of each panel, projections 50 are provided, these projections being pivotally received within blocks 52 of suitable material, such as nylon, positioned on opposite sides of the panel. The blocks 52 are slotted to receive connecting links 54 through which the projections 50 extend. Links 54 interconnect the projections 50 of one panel to similarly disposed projections 50 of an adjacent panel. At the ends of the rearmost edges of each panel, additional blocks 56 are provided. The blocks 52 project outwardly from their associated panel to a greater extent than do blocks 56, for reasons which will become apparent hereinafter. At opposite ends of floor 34, a flat panel 58 is pivotally linked to the adjacent gridded panel 48 of the floor. Panel 58 is provided with elongated bearing members 59 secured to the side edges of the panel. The upper surface of panel 58 supports slotted blocks 60 adjacent its edges. The slots are adapted to receive a tow bar in a manner to be described hereinafter.

At the juncture of panel 58 and the first of the panel sections 48, a vertical partition 62 is secured to the leading edge of the panel 48. Such a partition also is provided at the trailing edge of panel 58 at the opposite end of the floor. Intermediate the ends of the floor, similar partitions 62 are provided at desired increments. The partitions are secured to the pivotally mounted edges of the floor panels 48. In cooperation with the rigid screens 32, floor 34 and side grills 46, the partitions 62 separate the cage assembly into individual compartments. Typically, each compartment has a volume sufficient to permit approximately 200 chicks to reach an age of 3 weeks without overcrowding the compartment.

Figure 5:
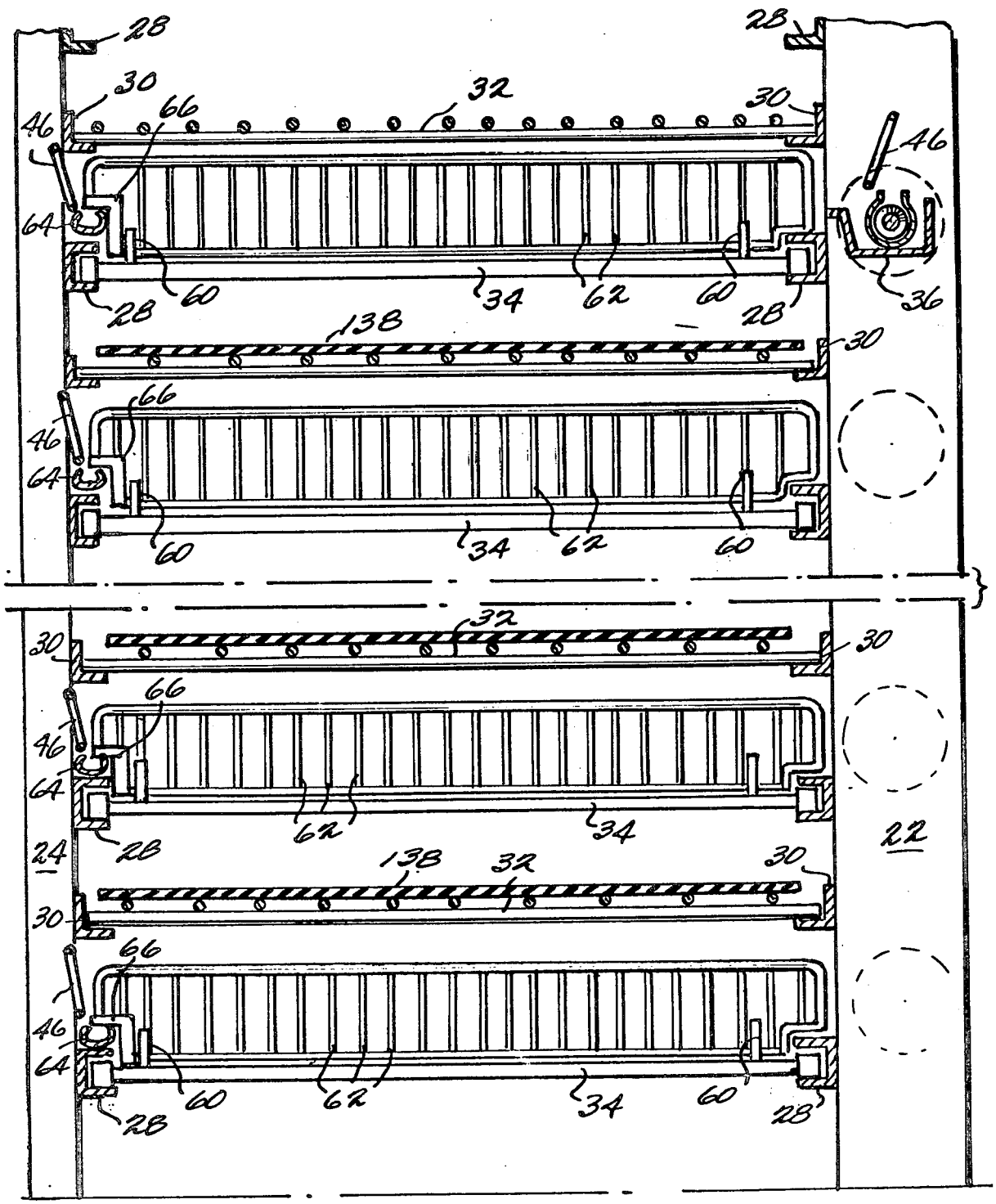
FIG. 5 is a fragmented end view, partially in section, of a cage assembly.

The relationship between the floor 34, screen 32, partition 62 and grills 46 can be appreciated by reference to FIG. 5. More particularly, the floor 34 is illustrated as being supported by the channels 28, while the screen 32 is retained in position by angle irons 30, so as to form, respectively, the floor and ceiling of each tier of a cage assembly. A watering trough 64 extends along the cage assembly at each level, as does the feed trough 36 on the opposite side of the assembly. The grills 64 are pivotally secured to their respective support members 22 and 24 in such a manner as to permit inward movement, thereby providing access to the interior of each compartment. The partitions 62 each include at one edge a suitable resilient member 66 which permits the floor to be moved without hindrance by the troughs 64. Members 66 also prevent movement of chicks from one compartment to the next. It will be understood, of course, that by suitably contouring the partition 62, the resilient members 66 may be eliminated.

Figure 6:
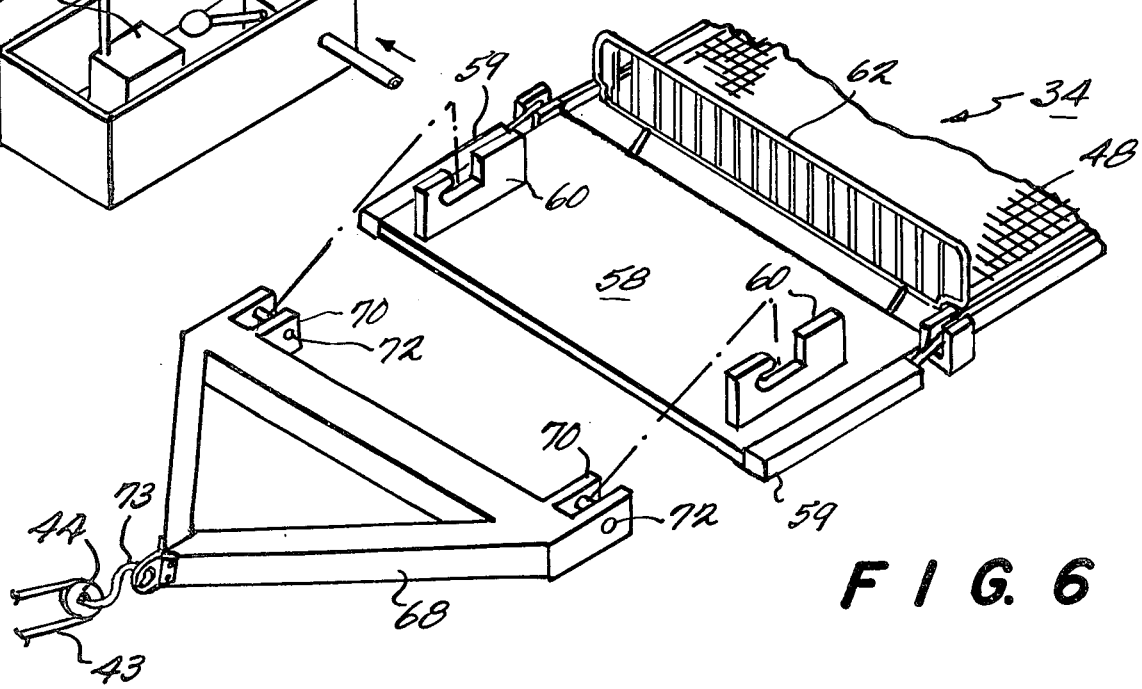
FIG. 6 is an exploded, fragmented perspective view illustrating the arrangement for displacing a floor portion of a cage assembly.

The manner by which a movable floor 34 may be displaced will be described with reference to FIG. 6. More particularly, FIG. 6 illustrates a tow bar comprising a yoke 68 having projecting pairs of spaced plates 70 on opposite sides thereof. A pin 72 extends between each pair of plates. The pins are adapted to be received within the slots provided in blocks 60 of the floor's panel portion 58. By connecting cable 43 via a sheave 44 and a hook 73 to the yoke 68, and in turn attaching the yoke to the floor 34, actuation of the winch 42 (FIG. 2) causes the floor to be moved along its associated channels 28.

An important aspect of the present invention is the ability to move the chicks into and out of the multi-tier cage assemblies. As stated previously, the cage assemblies are paired in end-to-end facing relationship. At least one of each paired cage assemblies is provided with an additional pair of floor-receiving channels 28 located above the uppermost screen 32. This is shown in FIG. 2. This permits an additional level of floor positioning.

By providing a bridge which spans the two facing cage assemblies, it is possible to move a floor from one of the assemblies to a vacent level in the other assembly. As now will be described, the transfer of a floor from one cage assembly to the other assembly is utilized in both the loading and unloading of the cages.

For purposes of explanation, it will be assumed that each of the cage assemblies has 6 levels at which chicks can be stored for approximately 3 weeks. It will be assumed further, in accordance with the discussion above, that at least one of the cages includes a 7th pair of floor-receiving channels 28 located above the 6th storage level of the cage assembly. Such an arrangement is shown diagrammatically in FIG. 7.

Presenting first the manner in which the cage assemblies are loaded, the first 6 levels of one cage assembly (A) each contain a movable floor. The 2nd through 7th levels of the other cage assembly (B) similarly contain movable floors. Thus, level 1 of assembly B is empty. At this time, the floors are oriented within their respective levels such that the partition-carrying edges of panels 48 and 58 are closer to the remote ends of the cage assemblies than to the facing ends of the assemblies.

By spanning levels 1 of cage assemblies A and B with a cross-over bridge 74, it is possible to transfer the floor at level 1 of cage assembly A to level 1 of assembly B. This is shown diagrammatically in FIG. 8.

Referring to FIGS. 7 and 8, yokes 68 are secured to the right-hand ends of the floors 34 in cage assembly A and to the left-hand ends of the floors in cage assembly B. The cables 43 associated with each assembly are operatively joined in these yokes by means of the respective sheaves 44 and hooks 73. An additional yoke is connected to the left-hand end of the floor located at level 1 of cage assembly A. The sheave and hook associated with level 1 of cage assembly B is connected to this additional yoke in such a manner that the cable 43 from cage assembly B extends from winch 42 through level 1 of the assembly, over bridge 74, around sheave 44, back over bridge 74, back through level 1 and then around assembly B's lowermost pulley 40. Upon actuation of winch 42 associated with cage assembly B, the corresponding winch of assembly A is declutched permitting assembly A's cable 43 to pay out. The floor at level 1 of cage assembly A is thereby pulled by assembly B's cable 43 across the bridge 74 and into level 1 of cage assembly B.

As the floor moves across the bridge, baby chicks are deposited in each compartment defined by the partitions 62 on the floor. Once the floor 34 being loaded is completely moved within level 1 of cage assembly B, the yoke 68, hook 73 and associated sheave 44 at the floor's right-hand end are disconnected and are secured to the right-hand end of the floor 34 at level 2 of the assembly B. The bridge 74 is repositioned to span the gap between level 2 of cage assembly B and the now-empty level 1 of assembly A. The winch 42 associated with cage assembly A then is actuated (after the other winch 42 is declutched) to transfer the floor from level 2 of cage assembly B to level 1 of the assembly A. Again, baby chicks are deposited onto the floor as it passes across bridge 74. The pattern just described is repeated until finally the floor at level 7 of cage assembly B is transferred to level 6 of assembly A. At this point, the loading operation is completed, and the chicks remain within the cage assemblies for approximately 3 weeks during which time they are fed, watered and ventilated under controlled conditions. Since the multi-tiered cage assemblies are designed to accommodate the expected growth of baby chicks during an approximate 3-week period, the space within the high density brood house is used with maximum efficiency to produce the maximum number of birds of that age.

When the time comes for removing the chicks from the brood house, the procedure for transferring floors from one level to the other is reversed from that described above with respect to loading. More particularly, the first transfer of floors is from level 6 of cage assembly A to the empty level 7 of cage assembly B. During this transfer, the birds are removed from the floor, as now will be described.

Figure 9:
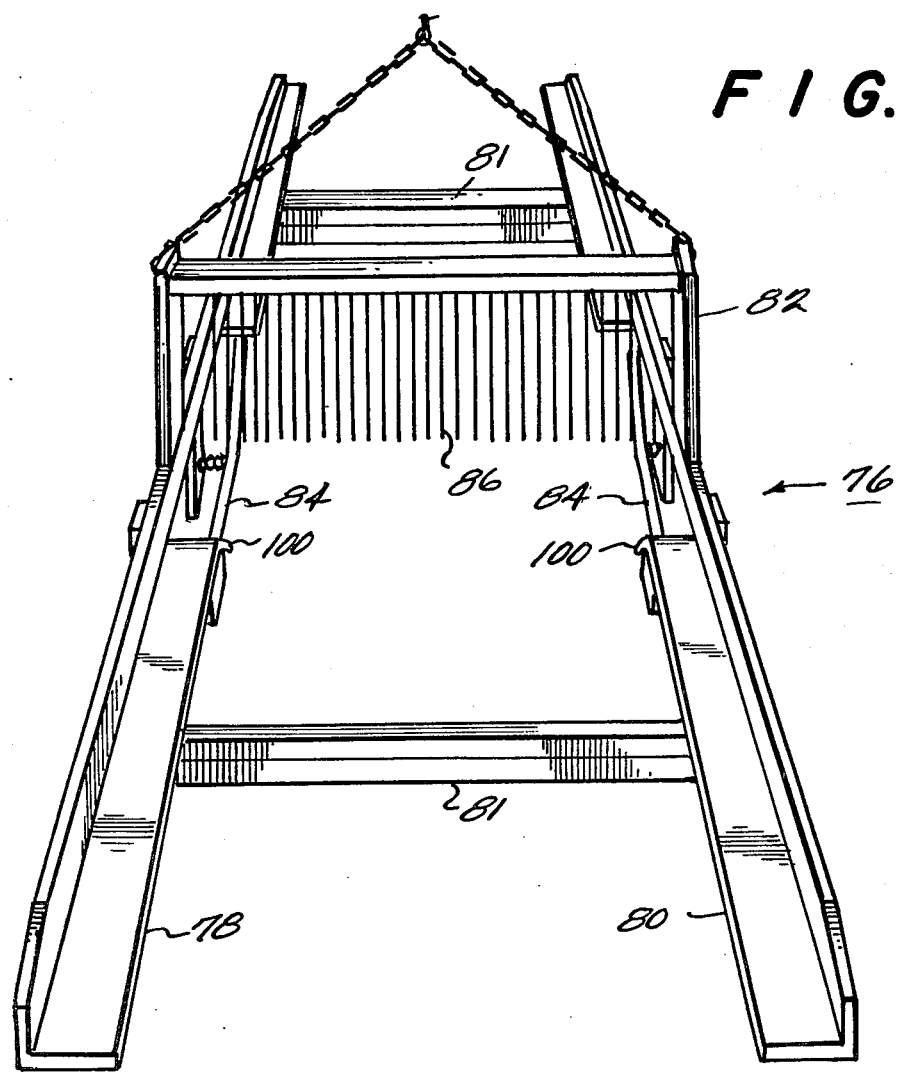
FIG. 9 is a front perspective view of a crossover bridge utilized in unloading chicks from the cage assemblies.
Figure 10:
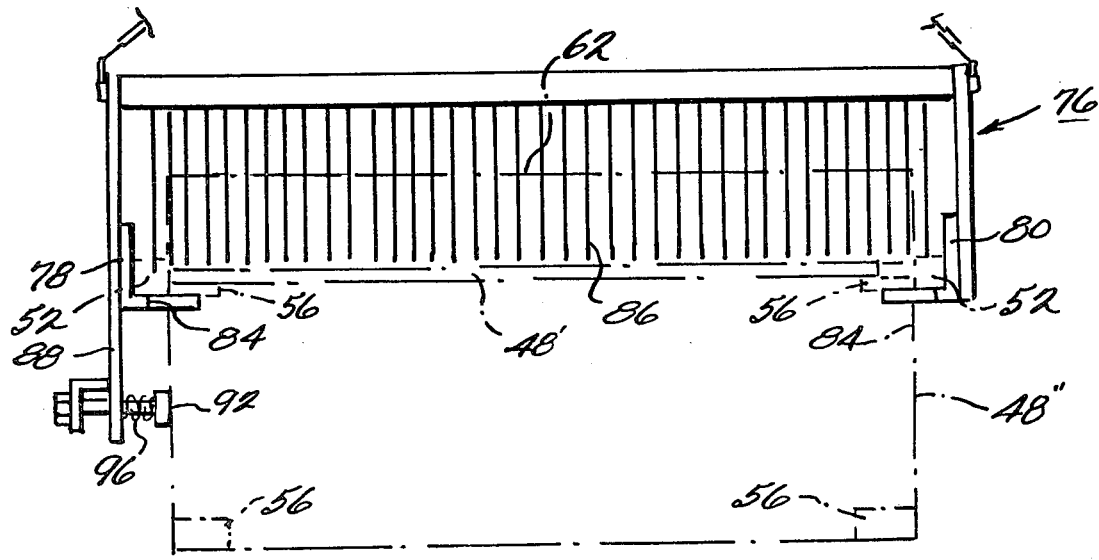
FIG. 10 is a front elevational view of the bridge shown in FIG. 9.

To unload, a cross-over bridge 76, somewhat different from that used for the loading operation, is employed. This bridge is illustrated in FIGS. 9 and 10.

As in the case of bridge 74, the main components of the unloading cross-over bridge 76 comprise a pair of parallel tracks 78 and 80 joined by struts 81 and a U-shaped cross support 82. Unlike bridge 74, however, the tracks 78 and 80, at a location intermediate their ends, are provided with notches 84 which reduce the width of each track. These notches are located below the cross support 82. Also, unlike bridge 74, the cross support 82 of bridge 76 serves to support a plurality of tines 86 which project downwardly towards the notched areas 84. These tines prevent the passage of chicks as the floor is moved across bridge 76.

It will be understood, of course, that while separate bridges 74 and 76 are described, a modifiable single bridge may be employed. More particularly, by providing inserts to cover notches 84 and by removing the tines 86, bridge 76 can be converted to one similar to bridge 74.

The tracks of bridge 76 support a spring-loaded swing damping arrangement the purposes of which hereinafter will be described. In FIG. 10, the details of the damping arrangement are shown. More specifically, a pair of arms 88 project downwardly from one of tracks 78 and 80 in the area of the notches 84. In FIG. 10, the arms 88 are shown in cooperative relationship with track 78. A horizontally extending bar 92 is connected between the arms 88 by a spring-loaded mounting device 96. The bar 92 runs in a direction parallel to tracks 78 and 80.

During the unloading operation, the floors 34 are moved in a direction whereby the leading edge of each floor panel section 48 (FIG. 3) comprises the pivotally mounted edge thereof. The blocks 52 which support the pivotal mountings of panels 48 are sufficiently wide so as to remain on tracks 78 and 80 throughout the entire passage of the floor across bridge 76. However, since the sliding blocks 56 at the rear edges of the panels 48 do not extend outwardly as far as blocks 52, when the blocks 56 reach the notched areas 84 of the bridge, they no longer are supported. Consequently, the rear edges of the floor panels successively drop, causing the panels to pivot from the position 48' shown in FIG. 10 to the position 48". The chicks supported on the floor panels thereby fall onto a conveyor (not shown) which is adjustably positioned immediately below the bridge 76 and which carries the chicks out of the high density brood house in a path transverse to the direction of movement of the floor. The tines 86 supported by the bridge's crossbar 82 prevent the passage of the chicks beyond the point where the floor panel drops.

As a panel 48 falls, one of its side edges engages the spring-loaded bar 92 of the swing damping mechanism so as to prevent the released panel from oscillating. Continued movement of the floor along tracks 78 and 80 brings the side edges of the dropped floor panel into engagement with the unnotched remaining portions of the tracks so as to lift the panel back onto the tracks. Guides 100 are provided on the underside of the tracks adjacent the edges of the notched areas 84 to engage the blocks 56 on the trailing edge of the dropped panel to facilitate return of the panel to the tracks.

As the bridge 76 is successively lowered during the unloading operation, the underlying conveyor for removing the chicks from the high density brood house also must be lowered. It can be appreciated, therefore, that in the lowermost position of bridge 76, the conveyor is below the level of the house's floor. The trench 12 accommodates the conveyor under this condition.

During the period of approximately 3 weeks that the chicks are in the cage assemblies, they are provided constantly with a supply of fresh feed and water. The manner by which this is accomplished now will be described.

In connection with FIG. 1, it was stated that feed is supplied to automatic feeder arrangements 18 provided for each cage assembly. Details of the feeder now will be presented with reference to FIGS. 11 and 12.

Feed is delivered from source 16 to a distribution unit 102 provided at a corner of each of the cage assemblies in the high density brood house. One such unit is illustrated in FIG. 11, the feed being shown as supplied through an inlet 104. The interior of unit 102 is divided into separate upper and lower chambers by a partition 106 substantially bisecting the unit 102. Consequently, feed passing through inlet 104 builds up in the upper chamber 108. Three conventional auger feed devices extend through the wall of unit 102 to the interior of chamber 108. These auger arrangements, generally indicated as 110, are located at levels corresponding to the upper 3 tiers of the cage assemblies A and B where chicks are maintained for approximately 3 weeks. Suitable drive means, generally indicated by numeral 112, are joined to the respective augers to operate them. The energization of motors 112 results in feed being removed from chamber 108 and directed along the length of a cage assembly. In conventional fashion, as the feed is carried by the augers, it is deposited within the troughs 36 (FIGS. 2 and 5) of the upper 3 storage levels. These troughs are accessible to the chicks within the cage assemblies.

Upon reaching the opposite end of the cage assembly, feed is introduced into the interior of an end unit 38. This unit, illustrated in FIGS. 2 and 12, includes a plurality of interior baffles 116 which direct feed being received from augers at the upper portion of unit 38 to respective lower positioned augers entering the bottom portion of unit 38. These additional auger feeders 118 are positioned at levels corresponding to the lower 3 tiers of cage asemblies A and B. Augers 118 are driven by motors 120. When energized, these motors return towards unit 102 that feed which has been received from augers 110. During such feed return, the troughs 36 along the lower 3 levels of the cage assembly are filled in the same manner as described with respect to the upper 3 levels.

Feed returned to unit 102 by augers 118 is deposited in the lower chamber 122 of unit 102. A vertically oriented auger 124 is joined to a wall of unit 102. At its lower end, the auger 124 communicates with chamber 122 through an aperture in the wall of the chamber. Thus, when the auger 124 is actuated by a drive 126, feed within chamber 122 is elevated to the top of unit 102 where it passes through an aperture at the top of chamber 108 whereby the latter receives feed which has been returned by augers 118. Thus, constant recirculation of excess feed is provided.

Figure 13:
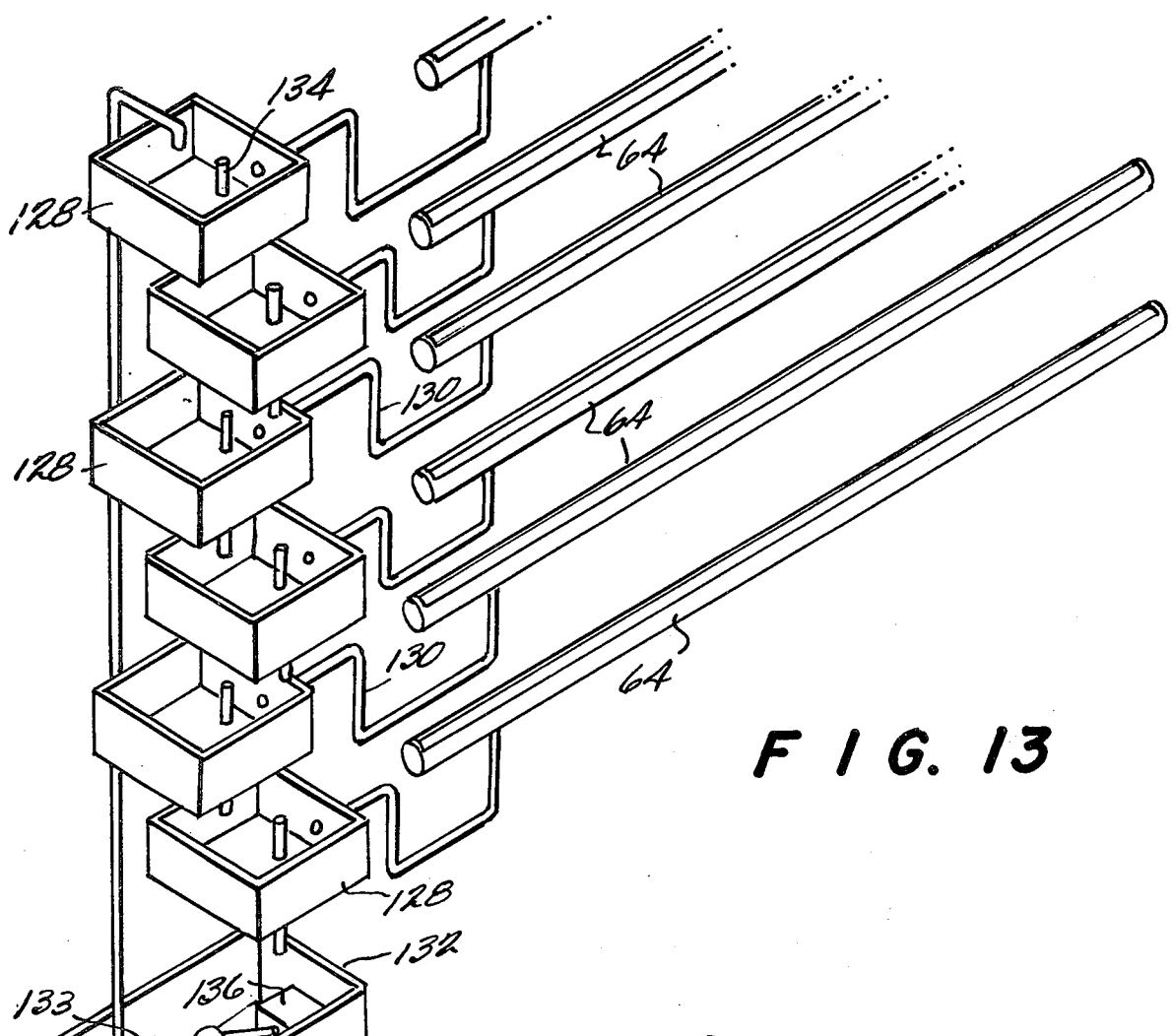
FIG. 13 is a fragmented perspective view of a watering system for a cage assembly.

A watering arrangement is illustrated in FIG. 13. This system is adapted to maintain a constant supply of water within receptacles comprising troughs 64 (FIG. 5) which extend the length of each case assembly and which are located within the compartments where the chicks are stored.

To maintain the proper level of water within each trough, a reservoir 128 is located at each of the cage assembly storage levels. Reservoirs 128 are connected to their respective troughs 64 by suitable conduits 130. The uppermost one of the reservoirs 128 is continuously supplied with water which is lifted from a main reservoir 132 by a pump 133. Each of the reservoirs 128 is in communication with the next lower reservoir and includes an overflow element 134 which establishes the maximum water level within the reservoir. The overflow from each reservoir 128 cascades downwardly to successively fill the next lower reservoir. The overflow from the bottommost reservoir 128 empties into supply reservoir 132, the maximum level of which is established by a float-controlled inlet valve 136. With a watering arrangement of this type, the water level in each trough 64 corresponds to that of its respective reservoir 128.

The manner in which droppings are removed from the cage assemblies is diagrammatically illustrated in FIGS. 14 and 15. More particularly, the rigid screens 32 below each of the movable floors 34 support litter removal mats 138 which prevent droppings from falling onto the chicks below, or in the case of the lowermost level, onto the floor of the house. Each of the mats 138 is adapted to receive at its opposite ends a tow bar arrangement of the general type described with respect to FIG. 6. For convenience of illustration, this detail is omitted from FIG. 14.

During the litter removal operation, the cross-over bridges 74 and 76 are removed from the space separating the facing ends of the cage assemblies, and a suitable roller support framework 140 is positioned so as to overlay the trench 12 in the floor of the high density brood house. Framework 140 is provided with vertically spaced rolls 142 positioned at different heights corresponding to the level of the litter mat to be cleaned. For a six-level cage assembly, three such rolls are utilized, each roll being positioned to service two levels. The framework 140 also supports an additional roll 144 positioned just above the trench 12. A scraper blade 146 is secured to the framework 140 in such a relationship with roll 144 that as the mat passes roll 144, droppings on its surface are scraped off so as to fall into trench 12 from which they may easily be removed.

The winch 42, pulleys 40, sheaves 44 and cable 43 used for moving the floors 34 also are employed in moving the litter mats 138. More particularly, the hooks 73 associated with sheaves 44 are disconnected from the floors 34 and are connected to the respective litter belt tow bars immediately below. At the opposite end of the cage assembly, one end of a cable 148 is connected to a selected litter belt's tow bar. The cable is operatively related to an additional winch 150 supported adjacent winch 42. By selectively actuating the winches 42 and 150, a litter mat first is moved in one direction past rolls 142, 144 and scraper 146 to clean the mat and then is returned in the opposite direction to its position on its associated rigid screen 32.

With the arrangement which has been described, it is apparent that the interior space of the high density brood house is efficiently utilized to maximize the number of birds which may be grown in approximately 3 weeks. During this time, clean feed and water are constantly provided. Since the chicks are retained in a confined area rather than being able to roam over the entire floor of a conventional finishing house, their access to feed and water is improved, thereby contributing to higher feed conversion. In addition to the improvement in feed conversion, the health of chicks during the critical early period of their lives is promoted inasmuch as they are maintained under controlled temperature and ventilation conditions. Still further, the chicks can easily be medicated, if required, though the feed and/or watering systems.

When housed within the cage assemblies, the chicks are not able to consume bedding material which is present on conventional finishing house floors and which customarily is pecked at by chicks. This is a contributing factor to improved feed conversion.

Furthermore, as a fertilizer, the droppings of the chicks are of improved quality, as compared with the mixture of droppings and bedding obtained from the cleaning of conventional finishing houses.

Following the initial grow-out period of approximately three weeks, the chicks are transported to a remotely located conventional finishing house for completion of their growth. A motor vehicle suitable for such transport is illustrated in FIGS. 16 and 17.

Figure 16:
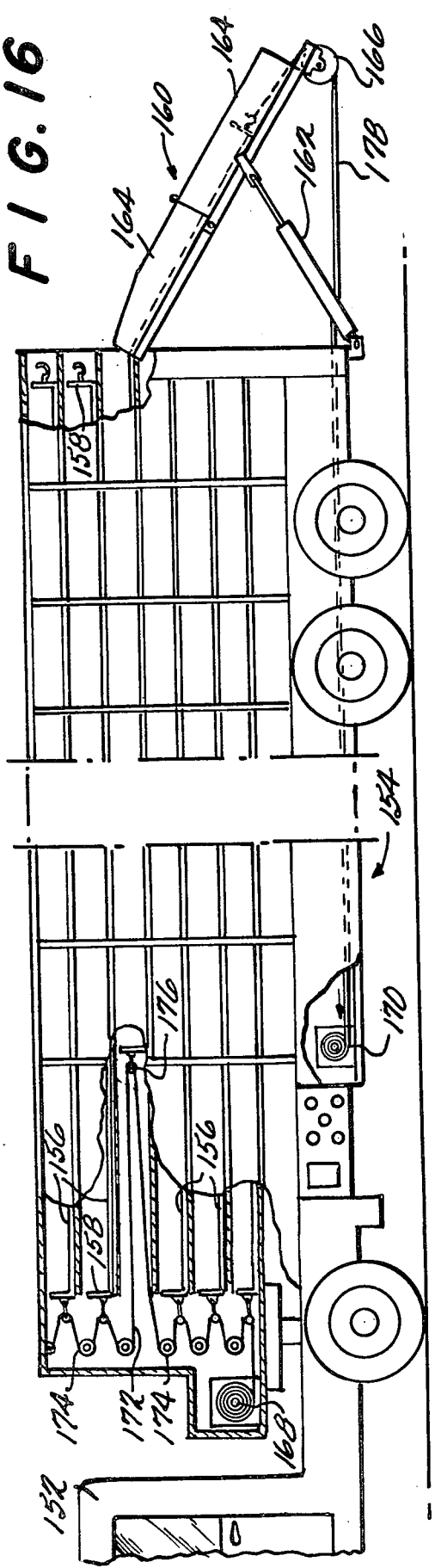
FIG. 16 is a diagrammatic view, partially in section, of a motor vehicle for transporting chicks to a finishing house.

Referring to FIG. 16, a conventional cab 152 is utilized to move a trailer, generally designated as 154. The trailer includes multilevel areas of storage each provided with a movable belt 156 having partitions 158 at least at opposite ends thereof. These partitions, together with the fixed portions of the trailer which define the storage levels, form compartments within which the chicks are stored during transport. By dividing the trailer longitudinally in half, two compartments are provided at each level of storage, each compartment having a belt 156. The trailer is provided with suitable fans (not shown) to move air through the trailer so as to provide ventilation for the stored chicks.

A movable ramp 160 is secured to the rear of the trailer, and in the case where the trailer is divided longitudinally in half, two such ramps 160 are provided.

Figure 17:
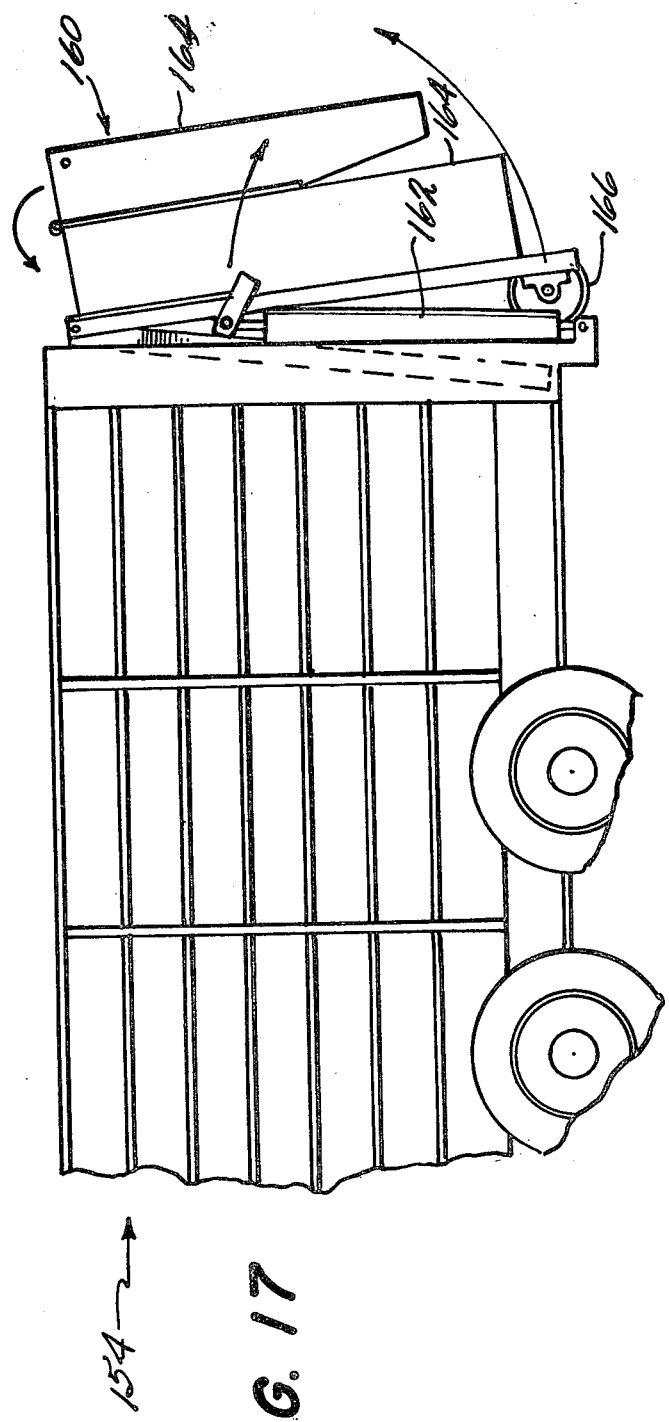
FIG. 17 is a diagrammatic view of a portion of the vehicle illustrated in FIG. 16 with the ramp portion thereof folded in a traveling position.

The folded-up transporting position of a ramp 160 is illustrated in FIG. 17. When the various portions of the ramp are swung in the directions of the arrowheads in FIG. 17, the ramp is readied for operation.

The forward end of ramp 160 is selectively adjusted to the several levels of the trailer 154 by actuation of a hydraulic cylinder 162. The ramp in its operative position comprises a flat central portion bounded on opposite sides by vertically extending walls 164 which retain chicks on the platform as they are moved to and from the storage compartments. A roll 166 is secured to the rear end of the ramp.

The trailer 154 is provided with a pair of winches 168 and 170. A cable 172 is associated with winch 168. This cable passes in serpentine fashion among a plurality of stationary pulleys 174 and sheaves 176 which are secured to the partitions 158 at the forward ends of belts 156.

A second cable 178 is operatively related to winch 170. This cable passes around roll 166 and is selectively connected to the partitions 158 at the rear of belts 156.

During a loading operation, a ramp 160 is placed in the unfolded position shown in FIG. 16 and is set at its forward end at the level desired for storage. The trailer is positioned proximate the trench 12 in a high density brood house, and cable 178 is joined to the partition 158 of the belt 156 at the level where the ramp is set. Winch 170 is then actuated (with winch 168 declutched) causing a belt to be withdrawn from its storage position, moved downwardly along the inclined platform 160, around roll 166 and beneath the trailer 154. When the forward partition 158 of the belt is at a convenient location on the platform, winch 170 is declutched, stopping movement of belt 156.

Upon actuation of winch 168, the direction of movement of belt 156 is reversed. Chicks dropped from the floors 34 of the high density brood house are deposited onto the belt which in turn conveys the chicks within the confines of the trailer.

The procedure just described is repeated for each level of storage in the transporting vehicle. When the vehicle is full, the ramp 160 is folded to the position shown in FIG. 17, and the chicks are transported to a conventional finishing house. There the ramp is unfolded, and as the vehicle moves at slow speed through the house, winch 170 is actuated moving a belt 156 from its stored position. Chicks are thereby carried down the inclined platform and are dropped on the floor of the finishing house. This procedure is repeated for each of the belts until the trailer is emptied.

It will be understood that while the apparatus and method described herein represent preferred embodiments of the invention, many variations are possible within the scope of the appended claims.

What is claimed is:

1. Apparatus for raising poultry during an initial grow-out period, comprising:
   a pair of multi-tier cage assemblies positioned in spaced end-to-end relationship with respective tiers of the assemblies being located at corresponding levels, the tiers of each assembly being vertically spaced from one another by a distance limited to that sufficient to provide head room for a chick approximately three weeks of age;
   a plurality of movable floors normally occupying respective tiers of said assemblies, but at least one of said assemblies having an unoccupied tier;
   bridge means positionable between said assemblies to span the spacing therebeween, said bridge means being adjustable to extend between any tier of one assembly and a tier of the other assembly at the same or the next higher or lower level; and
   means for alternately moving floors in sequence, across said bridge means from one of said assemblies to an unoccupied tier of the other assembly, each of said floors being adapted to enter chicks within a cage assembly during its movement in one direction and to remove chicks from the cage assembly during its movement in the opposite direction.

2. Apparatus as set forth in claim 1, further comprising:
   means provided along one side of said cage assemblies for supplying feed to said chicks.

3. Apparatus as set forth in claim 2, wherein said feed supplying means comprises:
   a plurality of horizontally disposed troughs arranged in vertically spaced relationship at each tier at which chicks are entered; and
   means for delivering feed along said troughs.

4. Apparatus as set forth in claim 2, further comprising:
   means provided along the opposite sides of said cage assemblies for supplying water to said chicks.

5. Apparatus as set forth in claim 4, wherein said water supplying means comprises:
   a plurality of receptacles disposed along said cage assemblies in vertically spaced relationship at each tier at which chicks are entered;
   a plurality of vertically spaced reservoirs each located at a level corresponding to that of a respective receptacle;
   means for continuously supplying water to the uppermost of said reservoirs;
   means provided in said reservoirs for establishing a maximum water level therein and for directing overflow downwardly through successive reservoirs to the lowermost of said reservoirs; and
   conduit means for connecting the reservoirs to their respective receptacles to continuously supply water to the receptacles.

6. Apparatus as set forth in claim 1, wherein said floors are formed of mesh sufficiently open to permit droppings of the chicks to pass therethrough and wherein the apparatus further comprises:
   a plurality of mats disposed within the cage assemblies and located beneath respective floors at each tier at which the chicks are entered;
   means for moving the mats outside of the cage assemblies;
   means for cleaning droppings from the mats as they are moved outside of the cage assemblies; and
   means for returning the mats to their locations within the cage assemblies.

7. Apparatus as set forth in claim 1, wherein each of said movable floors includes:
   a plurality of vertically oriented partitions located at spaced locations along said floor and extending transversely to the longitudinal axis thereof.

8. Apparatus as set forth in claim 1, wherein each of said movable floors comprises:
   a plurality of rectangular panels each having first and second edges extending transversely to the direction of movement of said floor;
   means associated with each panel for pivotally supporting its first edge and for slidably supporting its second edge, said pivotal supporting means extending outwardly beyond the slidable supporting means on opposite sides of the panel; and
   means for interconnecting the first edges of adjacent panels.

9. Apparatus as set forth in claim 8, wherein said first edge is the leading edge of each panel as the floor moves in said opposite direction to remove chicks from a cage assembly.

10. Apparatus as set forth in claim 9, and wherein said bridge means comprises:
    a pair of parallel tracks upon which said pivotal supporting means for the first panel edges continuously ride during movement of the floor from one assembly to the other, said parallel tracks having a pair of notches therein intermediate the ends of the tracks, said notches effectively reducing the width of each track to prevent the slidable supporting means from continuously riding on the tracks whereby during movement of the floor from one assembly to the other, the panels successively pivot about their first edges to drop chicks carried by the panels.

11. Apparatus as set forth in claim 10, wherein said bridge means further comprises:
    means for returning the slidable support means to the tracks as movement of the floor continues.

12. Apparatus as set forth in claim 10, further comprising:
    means connected to one of said tracks for damping the pivotal movement of said panels.

13. Apparatus as set forth in claim 10, wherein each of said panels includes:
    a partition secured to the first edge of said panel and extending in a plane normal to that of the panel.

14. Apparatus as set forth in claim 8, wherein said first edge is the trailing edge of each panel as the floor moves in said one direction to enter chicks within a cage assembly.

15. Apparatus as set forth in claim 14, and wherein said bridge means commprises:
   a pair of parallel tracks upon which said pivotal supporting means for the first panel edges and the slidable supporting means for the second panel edges continuously ride during movement of the floor from one assembly to the other.

16. Apparatus as set forth in claim 15, wherein each of said panels includes:
   a partition secured to the first edge of said panel and extending in a plane normal to that of the panel.

17. Apparatus for raising poultry during an initial grow-out period, comprising:
   a pair of multi-tier cage assemblies positioned in spaced end-to-end relationship, the tiers of each assembly being vertically spaced from one another by a distance limited to that sufficient to provide head room for a chick approximately three weeks of age;
   a plurality of movable floors normally occupying respective tiers of said assemblies, but at least one of said assemblies having an unoccupied tier, each of said movable floors including:
   (1) a plurality of rectangular panels each having first and second edges extending transversely to the direction of movement of said floor;
   (2) means associated with each panel for pivotally supporting its first edge and for slidably supporting its second edge, said pivotal supporting means extending outwardly beyond the slidable supporting means on opposite sides of the panel; and
   (3) means for interconnecting the first edges of adjacent panels; and
   means for alternately moving floors in sequence from one of said assemblies to an unoccupied tier of the other assembly, each of said floors being adapted to enter chicks within a cage assembly during its movement in one direction and to remove chicks from the cage assembly during its movement in the opposite direction, said means for moving the floors in said opposite direction including a bridge extending between said assemblies, the bridge comprising:
   a pair of parallel tracks upon which said pivotal supporting means for the first panel edges continuously ride during movement of the floor from one assembly to the other, said parallel tracks having a pair of notches therein intermediate the ends of the tracks, said notches effectively reducing the width of each track to prevent the slidable supporting means from continuously riding on the tracks whereby during movement of the floor from one assembly to the other, the panels successively pivot about their first edges to drop chicks carried by the panels.

18. Apparatus as set forth in claim 17, further comprising:
   means connected to one of said tracks for damping the pivotal movement of said panels.

19. Apparatus as set forth in claim 18, wherein said bridge further comprises:
   means for returning the slidable support means to the tracks as movement of the floor continues.

20. Apparatus as set forth in claim 17, wherein said means for moving the floors in said one direction from one cage assembly to the other includes a bridge of the type comprising:
   a pair of parallel tracks upon which said pivotal supporting means for the first panel edges and the slidable supporting means for the second panel edges continuously ride during movement of the floor from one assembly to the other.

21. Apparatus as set forth in claim 20, wherein each of said panels includes:
   a partition secured to the first edge of said panel and extending in a plane normal to that of the panel.

22. Apparatus as set forth in claim 17, further comprising:
   means provided along one side of said cage assemblies for supplying feed to said chicks.

23. Apparatus as set forth in claim 22, wherein said feed supplying means comprises:
   a plurality of horizontally disposed troughs arranged in vertically spaced relationship at each tier at which chicks are entered; and
   means for delivering feed along said troughs.

24. Apparatus as set forth in claim 22, further comprising:
   means provided along the opposite sides of said cage assemblies for supplying water to said chicks.

25. Apparatus as set forth in claim 24, wherein said water supplying means comprises:
   a plurality of receptacles disposed along said cage assemblies in vertically spaced relationship at each tier at which chicks are entered;
   a plurality of vertically spaced reservoirs each located at a level corresponding to that of a respective receptacle;
   means for continuously supplying water to the uppermost of said reservoirs;
   means provided in said reservoirs for establishing a maximum water level therein and for directing overflow downwardly through successive reservoirs to the lowermost of said reservoirs; and
   conduit means for connecting the reservoirs to their respective receptacles to continuously supply water to the receptacles.

26. Apparatus as set forth in claim 17, wherein said floors are formed of mesh sufficiently open to permit droppings of the chicks to pass therethrough and wherein the apparatus further comprises:
   a plurality of mats disposed within the cage assemblies and located beneath respective floors at each tier at which chicks are entered;
   means for moving the mats outside of the cage assemblies;
   means for cleaning droppings from the mats as they are moved outside of the cage assemblies; and
   means for returning the mats to their locations within the cage assemblies.

27. Apparatus as set forth in claim 17, further comprising:
   means for conveying chicks dropped from said panels to a motor vehicle for transport to a finishing house at a remote location.

* * * * *